(12) United States Patent
Keibach

(10) Patent No.: US 10,744,610 B2
(45) Date of Patent: Aug. 18, 2020

(54) TURNTABLE FOR A MACHINE TOOL

(71) Applicant: FRANZ KESSLER GMBH, Bad Buchau (DE)

(72) Inventor: Bernd Keibach, Betzenweiler (DE)

(73) Assignee: Franz Kessler GmbH, Bad Buchau (DE)

( * ) Notice: Subject to any disclaimer, the term of this patent is extended or adjusted under 35 U.S.C. 154(b) by 149 days.

(21) Appl. No.: 15/856,484

(22) Filed: Dec. 28, 2017

(65) Prior Publication Data

US 2018/0133857 A1 May 17, 2018

Related U.S. Application Data

(63) Continuation of application No. PCT/EP2016/065373, filed on Jun. 30, 2016.

(30) Foreign Application Priority Data

Jul. 3, 2015 (DE) .................. 10 2015 110 780

(51) Int. Cl.
B23Q 11/12 (2006.01)

(52) U.S. Cl.
CPC ...... B23Q 11/126 (2013.01); *B23Q 2220/004* (2013.01)

(58) Field of Classification Search
CPC .......... H02K 41/0354; H02K 41/0356; H02K 41/03; H02K 41/031; B23Q 11/126; B23Q 11/127; B23Q 2220/004
See application file for complete search history.

(56) References Cited

U.S. PATENT DOCUMENTS

| | | | | |
|---|---|---|---|---|
| 5,239,892 A | * | 8/1993 | Sakai | B23Q 1/28 108/139 |
| 5,524,502 A | * | 6/1996 | Osanai | B23Q 1/38 108/141 |
| 6,082,010 A | * | 7/2000 | Lee | B23Q 1/38 33/1 M |

(Continued)

FOREIGN PATENT DOCUMENTS

| | | |
|---|---|---|
| CN | 101480778 A | 7/2009 |
| DE | 202 02 998 U1 | 5/2002 |

(Continued)

OTHER PUBLICATIONS

German Search Report (Application No. 10 2015 110 780.5) dated May 10, 2016.

(Continued)

*Primary Examiner* — Tyrone V Hall, Jr.
(74) *Attorney, Agent, or Firm* — Burr & Brown, PLLC

(57) ABSTRACT

A rotary table for a machine tool comprising a stator unit, a rotor unit rotatable at least about a rotational axis, wherein the rotor unit comprises at least one receiving unit for the reception of a workpiece, a first bearing unit for the mounting of the rotor unit in the stator unit, and an electromagnetic motor drive for the motorized driving of the rotor unit. The rotor unit, at least in the region of the motor drive and/or of the first bearing unit, has at least one rotor-cooling apparatus, comprising a cooling medium and at least one cooling surface, for the cooling and/or absorption of waste heat from the motor drive and/or from the first bearing unit.

16 Claims, 3 Drawing Sheets

(56) References Cited

U.S. PATENT DOCUMENTS

| | | |
|---|---|---|
| 2005/0097976 A1 | 5/2005 | Nitta |
| 2008/0047120 A1* | 2/2008 | Soroka ................ B23Q 1/01 29/27 C |
| 2008/0191570 A1* | 8/2008 | Negele ............. F16C 19/381 310/90.5 |
| 2008/0302208 A1* | 12/2008 | Yonenaga ........... B23Q 11/141 74/813 R |
| 2009/0235783 A1* | 9/2009 | Duane ............... B23Q 16/102 74/183 C |
| 2009/0308285 A1* | 12/2009 | Bode ............... B23Q 11/0032 108/22 |
| 2011/0001282 A1* | 1/2011 | Taniguchi ............ B23Q 1/522 269/55 |

FOREIGN PATENT DOCUMENTS

| | | |
|---|---|---|
| DE | 60 2004 008 552 T2 | 5/2008 |
| DE | 10 2012 011 206 A1 | 12/2012 |
| DE | 20 2011 106 198 U1 | 3/2013 |

OTHER PUBLICATIONS

International Search Report and Written Opinion (Application No. PCT/EP2016/065373) dated Oct. 12, 2016.

\* cited by examiner

TURNTABLE FOR A MACHINE TOOL

CROSS REFERENCE TO RELATED APPLICATIONS

This application is a continuation of International Application No. PCT/EP2016/065373 filed Jun. 30, 2016, which designated the United States, and claims the benefit under 35 USC § 119(a)-(d) of German Application No. 10 2015 110 780.5 filed Jul. 3, 2015, the entireties of which are incorporated herein by reference.

FIELD OF THE INVENTION

The present invention relates to a rotary table for a machine tool, wherein a stator unit and a rotor unit rotatable at least about a rotational axis are provided.

BACKGROUND OF THE INVENTION

The function of machine tools is in general to generate component geometries of a workpiece, preferably with machining techniques, which component geometries are precisely defined in terms of shape, position and dimensions. In this context, the requirements with regard to accuracy are becoming ever greater, wherein not only a hundredth, but also, at least in part, even a thousandth of a millimeter accuracy is demanded.

A rotary table is a part of a machine tool, on which workpieces are clamped for machining. The rotary table has a vertical or, in some applications, a horizontal rotational axis, about which a rotary plate or indexing plate, or workpiece table, can be rotated with the clamped workpiece, so that metal cutting operations can be performed in various positions or on the rotating workpiece. Thus, the rotary tables can be used for turning or milling.

Depending on the application, servomotors with gearing, or often also direct drives with torque motors, are employed as the drives.

In metal cutting, in recent decades the requirements regarding accuracy and rigidity, as well as the maximum possible rotation speed of the rotary table, have become ever greater. Thus, depending on the application, the rotary tables have hitherto been designed, with regard to turning, with relatively high rotation speeds, generally greater than 1000 revolutions per minute or, on the other hand, with regard to milling, with high rigidity.

Also higher rotation speeds result in a stronger heat load upon the respective components, and thus to greater thermal stresses, which generates adverse deformations/changes with respect to the achievable accuracy in the machining. This reduces the suitability of the rotary table for turning.

SUMMARY OF THE INVENTION

The object of the present invention is, by contrast, to propose a rotary table for machine tools which meets higher requirements both with regard to high rotation speeds and, at the same time, with regard to high rigidity or accuracy, and thus, in particular, is universally usable or exhibits good properties with regard to use for turning and, at the same time, for milling.

Accordingly, a rotary table according to the present invention is distinguished by the fact that the rotor unit, at least in the region of the motor drive and/or of the first bearing unit, has at least one rotor-cooling apparatus, comprising a cooling medium and at least one cooling surface, for the cooling and/or absorption of waste heat from the motor drive and/or from the first bearing unit. Thus, the rotor-cooling apparatus is configured as an (internal) motor-cooling apparatus of the motor drive and/or as a bearing cooling apparatus.

Such an "internal" cooling of the rotor unit or the rotor, specifically of the motor drive and/or the mounting of the rotary table, results in a long working life of the rotary table and to an advantageous temperature regulation, and hence to high machining accuracy. Moreover, due to the "internal" cooling of the mounting or the inner race(s) of the mounting, higher rotation speeds can also be realized. Thus, the dissipated heat of the mounting is advantageously removed or cooled, so that adversely high temperature peaks of the mounting can be effectively avoided.

In the prior art, in practice solely an "external" cooling of the stator casing, and, where appropriate, of the outer race of the bearing mounting, has for decades hitherto been realized. With the aid of the inventive "internal cooling" of the motor core and/or of the bearing mounting or an inner race, a marked improvement of the cooling or the temperature regulation of the rotary table, and thus a significantly higher machining accuracy, can be achieved. Especially in combination with an "external cooling" of the stator or of the stator unit, an almost comprehensive or complete cooling/temperature regulation of the whole of the rotary table can henceforth be achieved.

Thermal deformations, especially of the table plate, are a major nuisance factor in the machining, which, insofar as they are not compensated, lead to considerable geometric errors on the workpiece/component which is to be produced. These deformations arise, inter alia, from the heating of different regions of the rotary table during operation, and the cause of this heating are frequently very different sources of power loss within the rotary table.

In addition to the mounting of the rotor unit, a significant source of power loss is the electromotive drive or motor drive in directly driven rotary tables. The integrated motor drive, i.e. the electric motor, converts the electrically supplied energy into useful energy, but also always, to a certain extent, into lost energy. Since modern rotary table drives in part have a considerable electrical power, the losses are in part also considerable.

Advantageously, at least a second bearing unit is provided for the mounting of the rotor unit, wherein a spacing is provided between the first bearing unit and the second bearing unit. With the aid of two separate bearing units, which are spaced apart, particularly high tilting moments can be absorbed and high machining accuracy, both in turning and in milling, can be ensured. The advantageous positioning of two separate bearing units at two appropriately spaced positions within the rotary table has the effect that a high rigidity or an effective prevention of tilting of the rotary table or of the rotational axis or the rotary plate/indexing plate is realized.

In an advantageous variant of the present invention, at least between the first and the second bearing unit is provided at least a bearing cooling apparatus, comprising at least one cooling surface and a cooling medium, for the cooling and/or absorption of waste heat from the first and the second bearing unit. It is herewith achieved that detrimental waste heat from the first and/or the second bearing unit does not lead to adverse stressing or damaging of at least one of the two bearing units.

Preferably, the rotor cooling apparatus or bearing cooling apparatus has at least one annular duct, extending substantially over the whole of the periphery, for the distribution and/or collection of cooling medium, in particular the annular duct, viewed along the rotational axis in the axial direction and/or transversely to the rotational axis in the radial direction, is arranged between the first and the second bearing unit. A full cooling or temperature regulation of the inside or core of the rotor unit and/or of the first and/or second bearing unit, in particular of the inner race(s) of the first and/or second bearing unit, is herewith achieved. Especially in combination with an "external" casing cooling, i.e. in particular a cooling of the stator unit and/or of the respective outer race(s) of the first and/or second bearing unit, this results specifically in an advantageous uniform cooling/temperature regulation of the first and/or the second bearing unit. Adverse thermal stresses or loads can herewith be effectively and extensively avoided or diminished. This results in a particularly high achievable machining accuracy with the rotary table according to the present invention.

In an advantageous variant of the present invention, the rotor or bearing cooling apparatus comprises surface-enlarging cooling structures. These surface-enlarging structures or the surface enlargement ensure(s) a better heat transfer via the cooling or thermal contact surfaces.

In a preferred embodiment of the present invention, a plurality of cooling ducts and/or cooling elements, respectively having at least one cooling surface and distributed/arranged at least partially over the periphery, are provided. Preferably, the cooling ducts and/or cooling elements, for example between, say, 3 to 15, preferably about 6-10 elements/ducts, are arranged almost uniformly and/or symmetrically in relation to the cross section of the rotary table or of the rotor unit, preferably distributed over the whole of the periphery. An advantageous surface enlargement of the active cooling or heat exchanger surface and, moreover, a particularly uniform and extensive cooling/temperature regulation, especially of the rotor unit or of the whole of the rotary table, can herewith be achieved, preferably additionally with the aid of an external, substantially comprehensive stator cooling and/or stator housing cooling.

Advantageously, the cooling ducts and/or cooling elements respectively have at least one substantially radially oriented portion. An advantageous distribution of the cooling fluid in radially spaced regions/zones of the rotor unit can herewith be accomplished. Thus, for example, in the case of two first and second bearing units, which are radially spaced apart or have differently large diameters, a cooling of these two bearing units and/or of the intervening intermediate region of the rotor unit can be realized. This intermediate region can alternatively or additionally also be cooled with an annular duct according to the present invention. These measures improve the (internal) cooling of the rotor unit.

In one particular refinement, the substantially radially oriented portions of the cooling ducts and/or cooling elements are arranged substantially perpendicular to the rotational axis and/or on one plane or on a flat surface. Thus, the cooling ducts and/or cooling elements are arranged substantially in a star shape and radially on this plane, wherein the rotational axis of the rotor unit is configured as a surface normal of this plane. The preparedly radially oriented portions of the cooling ducts and/or cooling elements are advantageously arranged substantially without offset in the direction of the rotational axis and, in particular, perpendicular/orthogonal to the rotational axis.

In initial studies, it has been shown that a particularly uniform radial cooling can herewith be realized, so that only very small or almost no adverse thermal changes of the rotor unit or of the position of the rotational axis are realized.

In an advantageous embodiment, the substantially radially oriented portions of the cooling ducts and/or cooling elements are arranged between a first annular duct, configured as a distributing annular duct, for distributing cooling medium into the portions, and a second annular duct, configured as a collecting annular duct, for collecting cooling medium from the portions. A particularly advantageous cooling of the rotor unit can herewith be realized. Thus, inter alia, an adverse change in temperature in the direction of the longitudinal axis can be effectively avoided or reduced.

In general, according to the present invention, a, in the peripheral direction, uniform temperature of the rotary table, in particular of the rotor unit, can be achieved/realized. This is advantageously ensured especially by a combination of distributing annular duct and collecting annular duct, as well as intervening, radially oriented cooling ducts. In this context, the annular ducts realize a uniform temperature distribution in the peripheral direction, wherein a (significant) change in temperature of the cooling medium as a result of heat absorption takes place substantially along the radially oriented cooling ducts or cooling elements.

Consequently, according to the present invention, no relevant temperature changes/increases can arise or be attained in the peripheral direction, but rather substantially only in the radial direction. This advantageously results in the avoidance of an adverse change in the orientation of the rotational axis, and thus in a particularly high quality in the machining of the workpiece or of the operation of the machine tool.

Advantageously, at least one of the cooling ducts and/or cooling elements has at least one pressure control element for controlling or adjusting the pressure of the cooling medium, at least within the cooling duct/element. Preferredly, each cooling duct and/or each cooling element respectively has a separate pressure control element. An advantageous control or adjustment of the pressure and of the flow rate of the (different) cooling ducts and/or cooling elements can herewith be attained, so that respectively, as far as possible, an almost equal flow volume or equal volumetric flow rate through all cooling ducts/elements, and thus an equal cooling capacity of all cooling ducts/elements, is realized.

This is of great advantage, for instance, where the feed line or a flow admission unit, such as, for example, a rotary feedthrough and/or fluid line/hose, has a relatively small cross section, and the cooling ducts/elements have relatively large flow cross sections, in particular where the cooling ducts or cooling elements have a total cross section which is greater than the total cross section of the feed line or flow admission unit. Relatively large flow cross sections of the cooling ducts/elements generate relatively large heat exchanger or cooling surfaces, which is particularly advantageous.

Also, due to production-based minor differences/tolerances, a somewhat different flow velocity or flow rate of the cooling medium could otherwise also arise in each cooling duct during operation, and thus result in a somewhat different cooling capacity, which could lead to certain drawbacks in the cooling, and thus to different thermal heat expansions/stresses. Correspondingly, non-uniform cooling capacities or thermal stresses are effectively avoided through one or more advantageous pressure control elements of the cooling ducts and/or cooling elements. It is conceivable that a separate activation or control of the pressure control elements is accomplished. Thus, the flow velocity in the individual cooling ducts could respectively be realized separately by an advantageous (electrical/electronic) control unit with the aid of the respective pressure control elements.

For instance, a pressure control element is configured as a valve and/or as a restrictor/nozzle and/or as a stud screw having an inner flow duct or a bore. This bore, or a corresponding flow duct of the stud screw, can be produced separately and with high precision, so that an exactly defined throughflow or flow volume through each of these stud screws/restrictors is achieved in a particularly cost-effective manner. A corresponding stud screw can be fixed or arranged advantageously by means of an internal thread of a cooling duct/element.

Preferably, the cooling ducts have comparatively large diameters, and thus a relatively large cooling surface, in order to realize an advantageous cooling. Advantageously, the pressure control element or the nozzle/restrictor and/or stud screw with bore is arranged at the end of the respective cooling duct or cooling element, or in an end portion of the cooling duct. In the cooling duct/element, an "accumulation" of the flowing cooling medium is herewith generated, so that, during operation, a uniform pressure is ensured throughout the cooling duct or cooling element.

Preferably, the plurality of cooling ducts and/or cooling elements are arranged according to the present invention between a first annular duct and a second annular duct. Advantageously, the first annular duct can herewith be configured as a distributing annular duct and the second annular duct as a collecting annular duct. With the aid of an in this way advantageous cooling unit, with one or two or just a few supply lines/elements, and only one or two or just a few drain lines or outflow elements, an advantageous recirculation of the cooling medium within the rotary table or in/through the rotor unit of the rotary table can, for instance, be accomplished. A given or defined cooling circuit can herewith be attained.

A defined circuit of the cooling medium or of the cooling liquid can realize a defined, best possible heat transfer/release, wherein, advantageously, a cooling liquid or the cooling medium can be guided/conducted exactly at at least one/one or more defined points on or regions of the rotary table, in order here to absorb heat and, where appropriate, conduct it to an external heat exchanger/cooler. Preferably, a defined cooling circuit of the cooling medium or of the liquid coolant has at least one pressure generating unit or a circulating pump or the like, and/or a medium reservoir such as, for example, an equalizing tank or the like.

Advantageously, one or more rotary feedthrough(s) is/are provided for the supply and/or removal of one or more different fluids, such as, for example, the cooling medium and/or a fixing/clamping medium for the clamping or fixing of the workpiece on the table plate, in particular of a pressurizable gas or of compressed air and/or of a hydraulic oil.

With regard to the use of two separate bearing units, it should also be noted that an optimization of the first bearing unit with respect to the absorption of radial forces or radial loads and, at the same time, an optimization of the second bearing with respect to the absorption of axial forces or axial loads can herewith be accomplished. The rotary table according to the invention hereby ensures high rigidity and is especially suitable both for a turning operation and for a milling operation.

According to the present invention, the rotary table can be configured for a particularly high rigidity or absorption of relatively high torques, especially in milling, so that high quality in the milling of the workpiece is achieved. At the same time, the rotary table according to the present invention can advantageously be operated at relatively high rotation speeds, for example, greater than 1000 r.p.m., or even greater than 2000 r.p.m., so that high quality, especially in turning, is also achieved.

By contrast, for decades in the prior art, just a single bearing unit or a single axial-radial bearing has been used, i.e. in particular having a single inner race, since in a rotary table, systemically, there is always very little installation space available for the components, and especially for the mounting. This one or single bearing unit of the rotary table was designed/dimensioned, however, both for the turning operation and for the milling operation, so that the corresponding machine tool was only limitedly suitable for turning and for milling.

Consequently, the advantageous variant of the invention having two separate bearing units represents a departure from the decades-long standard practice and uses, in contrast hereto, two separate or mutually spaced bearing units in order to configure the rotary table for a turning operation and for a milling operation in a particularly advantageous manner, namely to ensure high accuracy and high rigidity, as well as a high rotation speed capability of the rotary table.

Within the meaning of the invention, a rotary table is defined, for instance, by the fact that a total length of the rotary table is smaller than or equal to an external diameter of the rotary table. For instance, the rotary table has a table plate or a rotary plate or indexing plate, which has an external diameter that is greater than the axial length of the rotary table housing, in particular, greater than the axial length of the rotor unit. Also, within the meaning of the present invention, in a directly driven rotary table with torque motor, the electromagnetic drive unit is configured such that a (maximum) external diameter of the (electromagnetic) stator or of the coil/coils is greater than the axial length of the (electromagnetic) stator or of the coil/coils of the stator.

A rotary table within the meaning of the invention advantageously has a table plate or a rotary plate or indexing plate that has at least one fixing unit for the fixing of a workpiece. Preferably, the fixing unit is configured as a clamping unit for the clamping of the workpiece, wherein, in particular, a pneumatic and/or hydraulic fixing/clamping is realized.

Furthermore, a rotary table within the meaning of the present invention has a one-sided mounting or bearing units, which is/are arranged between the table plate, or the rotary plate or indexing plate, and the drive system, in particular, the direct drive or torque motor. This means that, advantageously, both the first bearing unit and the second bearing unit are arranged between the table plate, or the rotary plate or indexing plate, and the drive system, or the electromagnetic rotor and stator, i.e. the torque motor.

Correspondingly, only unilaterally supported rotary tables, in particular with direct drive or torque motor, can have during operation, or during the machining, a vertically or horizontally oriented rotational axis. Especially in the embodiment with horizontal rotational axis, during the machining not only does the weight of the workpiece, which can amount, for example, to several 100 kg, or sometimes to almost 1000 kg, act on the mounting, or the first and the second bearing, but additionally also the weight of the solid rotary table, or of the rotor unit. Specifically in rotary tables of the type with, at least occasionally, horizontal rotational axis, the inventive configuration of two separate, mutually spaced bearing units is of particular advantage and ensures a high rigidity or accuracy of the rotary table, even in this machining position.

Preferably, the rotary table is configured as a swiveling circular table, wherein the rotary table has at least one rotation axis having about a horizontally oriented and/or orthogonal or perpendicular to the rotational axis of the rotor unit of the rotary table. This rotation axis is also referred to as the so-called A-axis, and the rotational axis of the rotor unit as the so-called C-axis. The advantageous rotary table according to the present invention can herewith be positioned both in a horizontal and in a vertical position of the rotational axis and/or of the table plate. Where appropriate, the workpiece can even also be machined rotated through 180°, or upside down.

Advantageously, the swiveling circular table has at least one, preferably two supporting arms, or swivel arms, which, for instance, (respectively) have a direct drive, or a torque motor, for the rotation about the rotation axis, or so-called A-axis. In rotary tables, this A-axis can be arranged both at an angle of 90° and at an angle of 45° in relation to the vertical plane.

Preferably, the first bearing unit is configured as an axial angular ball bearing and/or as an axial angular roller bearing, and/or the second bearing unit is configured as a cylindrical roller bearing or tapered roller bearing. In this case, the first, and also the second bearing unit, can be realized, for instance, as a single-row or double-row bearing, i.e. having one, or two mutually adjoining, raceway(s) on a common inner and/or outer race. It is herewith advantageously enabled that especially the cylindrical roller bearing, or tapered roller bearing, can absorb very high radial loads, or forces, and thus a particularly high radial rigidity of the rotary table according to the invention can be ensured. This is in particular of particular advantage for rotary tables with at least occasional horizontal rotational axis, wherein especially also the sometimes large weight of the workpieces acts correspondingly radially on the mounting.

In one particular refinement of the present invention, viewed at least transversely to the rotational axis in the radial direction, the spacing is formed between the first and second bearing unit. It is herewith achieved that, on the one hand, the mounting with the two separate bearing units can be realized in a very compact or space-saving manner. On the other hand, it is hereby achieved that a high tilt resistance of the rotary table, or the table plate, against very high loads can be attained. For instance, with this measure the two separate bearing units can be arranged adjacent to the torque motor, or to the electromagnetic direct drive system, and/or adjacent to the table plate, or to the rotary plate or indexing plate.

Thus, particularly small axial lengths of the rotary table, or of the rotary table housing and/or of the rotor unit, and thus a particularly "low", or flat construction of the rotary table according to the invention can be realized. This is of particular advantage, inter alia, for the use of rotary tables in modern machine tools, such as, for example, CNC machining stations or the like. This also allows a comparatively tall workpiece height, or large dimensioning, of the workpiece which is to be machined. For the "lower" the rotary table is configured in the axial direction, the larger/taller can be configured the workpiece to be machined, and/or the greater is the (vertical) installation space which the supporting or swivel arm(s) of a swiveling circular table can occupy, such that these can then be configured particularly stably, or rigidly.

For instance, the first bearing unit is arranged in the outer region and/or adjacent to the stator housing of the rotary table, and/or the second bearing unit in the middle, or inner region of the rotary table. Thus, particularly high torque loads can be absorbed without drawbacks arising in relation to the accuracy of the machining. Also, for the "internal" mounting, relatively small peripheral velocities are obtained, which can result in lesser load upon this bearing and, in part, in higher achievable rotation speeds of the rotor unit.

Advantageously, viewed along the rotational axis in the axial direction, the first bearing unit is arranged at least partially overlapping the second bearing unit. This means that this axial spacing is negative, and/or the two separate, mutually spaced bearing units are arranged in the axial direction, at least in part, at the same "height", or position. A particularly compact construction of the mounting according to the present invention, with two separate bearing units, is herewith obtained.

In one particular embodiment of the present invention, the second bearing unit, or the tapered or cylindrical roller bearing, has a smaller external diameter than the first bearing unit, which is configured, in particular, as an axial angular ball bearing. It is herewith ensured that the tapered or cylindrical roller bearing has a comparatively low peripheral velocity due to the smaller diameter. This advantageously results in the rotary table, or the rotor unit, being able to achieve relatively high rotation speeds without the tapered or cylindrical roller bearing having to experience adverse loads, i.e. in particular a greater build-up of heat. As a result of the higher rotation speeds which the rotary table can achieve during operation with the aid of this advantageous measure, a particularly advantageous turning operation can be realized.

The rotary table according to the present invention can advantageously be configured as a turning-milling table. That is to say that this combines both high requirements with regard to the maximally possible rotation speed and with regard to rigidity, in particular, the axial and radial rigidity/tilt resistance. Thus, with the aid of the present invention, the rotary table, or the machine tool, can during operation be used very flexibly both for turning operations and for milling operations. Accordingly, compared to the prior art, in which specific rotary tables for high-quality turning and specific rotary tables for high-quality milling were necessary, a cost-effective and particularly flexible use of the rotary table according to the present invention is realized.

In principle, according to the present invention, an (internal) cooling/temperature regulation of the rotor unit and, in particular, also of the stator unit, can be accomplished, wherein also during, or even after, lengthy operation of the rotary table, an adverse change, or a so-called "tilting", of the rotational axis as a result of thermal energy or thermal expansions is effectively prevented, or at least very heavily reduced.

BRIEF DESCRIPTION OF THE DRAWINGS

An illustrative embodiment of the present invention is represented in the drawing and is explained in greater detail below by reference to the figures.

DETAILED DESCRIPTION OF THE INVENTION

Figure 1:
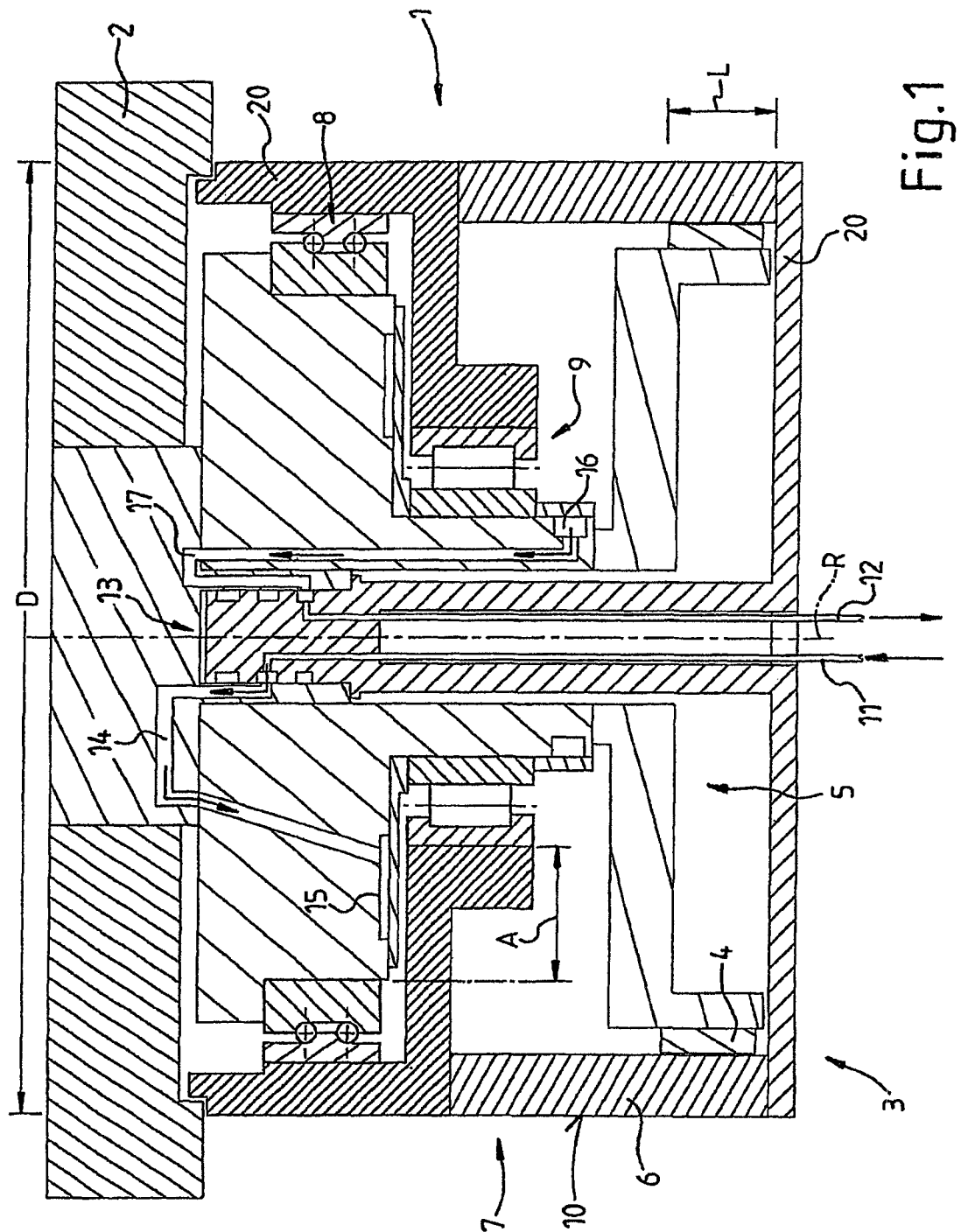
FIG. 1 shows a schematic first section through a rotary table with supply and removal of a cooling medium of the rotor.
Figure 2:
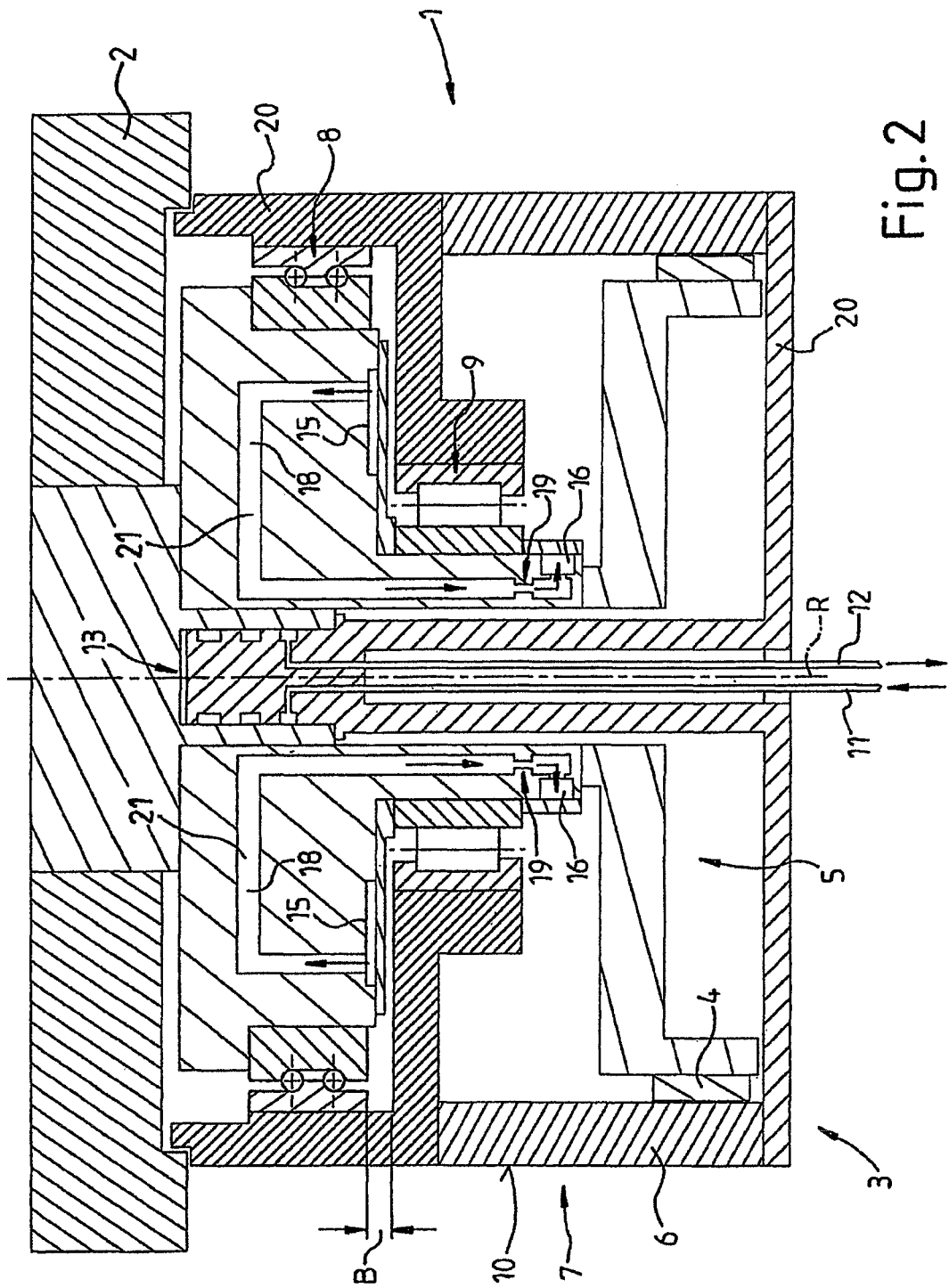
FIG. 2 shows a schematic, second section through cooling distribution ducts of the rotary table according to FIG. 1.

In FIGS. 1 and 2 a rotary table 1, which has a rotary table housing 20 and a table plate 2 or a rotary plate or indexing plate 2 for the fixing or for the clamping of a workpiece (not represented in detail) for machine cutting in a machine tool, is represented schematically. The fixing or the clamping of the workpiece can be realized in a known manner, for instance with a so-called three-jaw chuck or the like. To this end, the rotary table 1 or the table plate 2 can have (without detailed representation) a clamping fluid, i.e. a pressurizable gas, in particular, compressed air, or a pressurizable hydraulic fluid, in particular, a hydraulic oil, for the actuation of the fixing or clamping and/or of corresponding fixing or clamping elements such as the three-jaw chuck or the like.

In the present case, the rotary table 1 is constituted by a directly driven rotary table 1 having an electromagnetic drive 3 or torque motor, wherein the electromagnetic drive 3 has a plurality of permanent magnets 4, arranged in the peripheral direction, of a rotor unit 5, and also (represented merely schematically) electromagnetic driving coils 6 of a stator unit 7. In the present case, the electromagnetic drive 3 or electric motor 3 is represented very crudely or very schematically, since it is here a case of commonly known components of direct drive systems or torque motors of rotary tables 1.

In the figures, it becomes clear that the electric motor 3 has a radially oriented diameter D which is greater than an axially oriented length L of the electric motor 3 or of the permanent magnets 4 and/or driving coils 6. The diameter D (of the drive 3 and/or of the table plate 2) can also be configured, for instance, 2 to 5 times greater, or many times greater, than the length L (of the permanent magnets 4 and/or driving coils 6 and/or of a rotary table housing 20).

Moreover, in the figures is represented a rotational axis R, about which the rotor unit 5 can rotate. For clarification purposes, in the figures the rotor unit 5, or the rotating elements/components thereof, are marked with a crosshatching from top right to bottom left. By contrast, the stator unit 7 or the static components/elements of the rotary table 1 are marked with a crosshatching from top left to bottom right.

It thus becomes clear that a first bearing 8 has a static outer race and a rotatable inner race and also possesses, as a rolling element, a plurality of balls. In the present case, the first bearing 8 is constituted by an axial angular ball bearing having two raceways, or the first bearing 8 is advantageously configured as a double-row axial angular ball bearing. In addition, it becomes clear that the first bearing 8 has a comparatively large bearing diameter. That is to say that the first bearing 8 has a greater bearing diameter than a second bearing 9, which in the present case is configured as a cylindrical roller bearing having a plurality of cylinders as the rolling element.

Thus, between the first bearing 8 or the axial angular ball bearing 8 and the second bearing 9 or cylindrical roller bearing 8 in the radial direction, i.e. perpendicular or orthogonal to the rotational axis R, an advantageous radial spacing A is provided.

In the illustrative embodiment represented in the figures, an axial spacing B, moreover, is also provided in the axial direction, or in the direction of the rotational axis R, between the first bearing 8 and the second bearing 9. In a particularly advantageous refinement (not represented) of the present invention, the two separate bearings 8, 9, i.e. the first bearing 8 and the second bearing 9, overlap in the axial direction of the rotational axis R, so that no and/or a negative axial spacing B is formed in the axial direction of these two overlapping bearings 8, 9. This last-named variant of the bearing arrangement is particularly space-saving in a rotary table according to the present invention, so that this can have a particularly small/short axial overall length.

As a result of the advantageous, comparatively small bearing diameter of the second bearing 9 or of the cylindrical roller bearing 9, the rotary table according to the present invention can realize comparatively high rotation speeds, preferably greater than 1000 revolutions per minute, without the mounting, and especially also the cylindrical roller bearing 9, being overloaded, or possibly damaged.

By virtue of the advantageous configuration of two mutually spaced bearing units 8, 9, a particularly large axial and also radial rigidity of the rotary table 1 or of the table plate 2 is attained. The rotary table 1 can thus be flexibly used both for turning and for milling operations, and herein not only make high rotation speeds possible, but also high rigidity and thus high accuracy of the machining.

Without detailed representation, on an external outer side 10 or surface of the stator 6 can be provided a cooling system, in particular, a liquid-cooling system, in order, especially, to cool the electric motor 3 or electromagnetic drive 3 from outside or from the stator side.

Advantageously, the rotary table 1 according to FIGS. 1 and 2 additionally has an advantageous "internal" cooling of the rotor unit 5 or the rotatable components thereof, i.e. viewed from the side/direction of the central/middle rotational axis R. To this end, the rotary table 1 or the rotor 5 advantageously has a feed line 11 and a discharge line 12, in order to supply and remove a cooling medium, preferably a cooling liquid, to and from the rotor 5.

With the aid of an advantageous rotary feedthrough 13, the cooling medium is conducted via at least one forward-flow duct 14 to a first annular duct 15.

A return flow of the advantageous internal cooling of the rotary table 1 or of the rotor 5 takes place via a second annular duct 16, which leads via at least one return-flow duct 17 to the rotary feedthrough 13 and to the discharge duct 12.

The two annular ducts 15 and 16 extend substantially fully, i.e. through 360°, about the rotational axis R of the rotor unit. It is herewith ensured that the cooling medium, in particular, the cooling liquid, is distributed comprehensively or symmetrically about the rotational axis R, i.e. in the first annular duct 15, and collected by means of the second annular duct 16, and can flow to/away from the rotary feedthrough 13.

Figure 3:
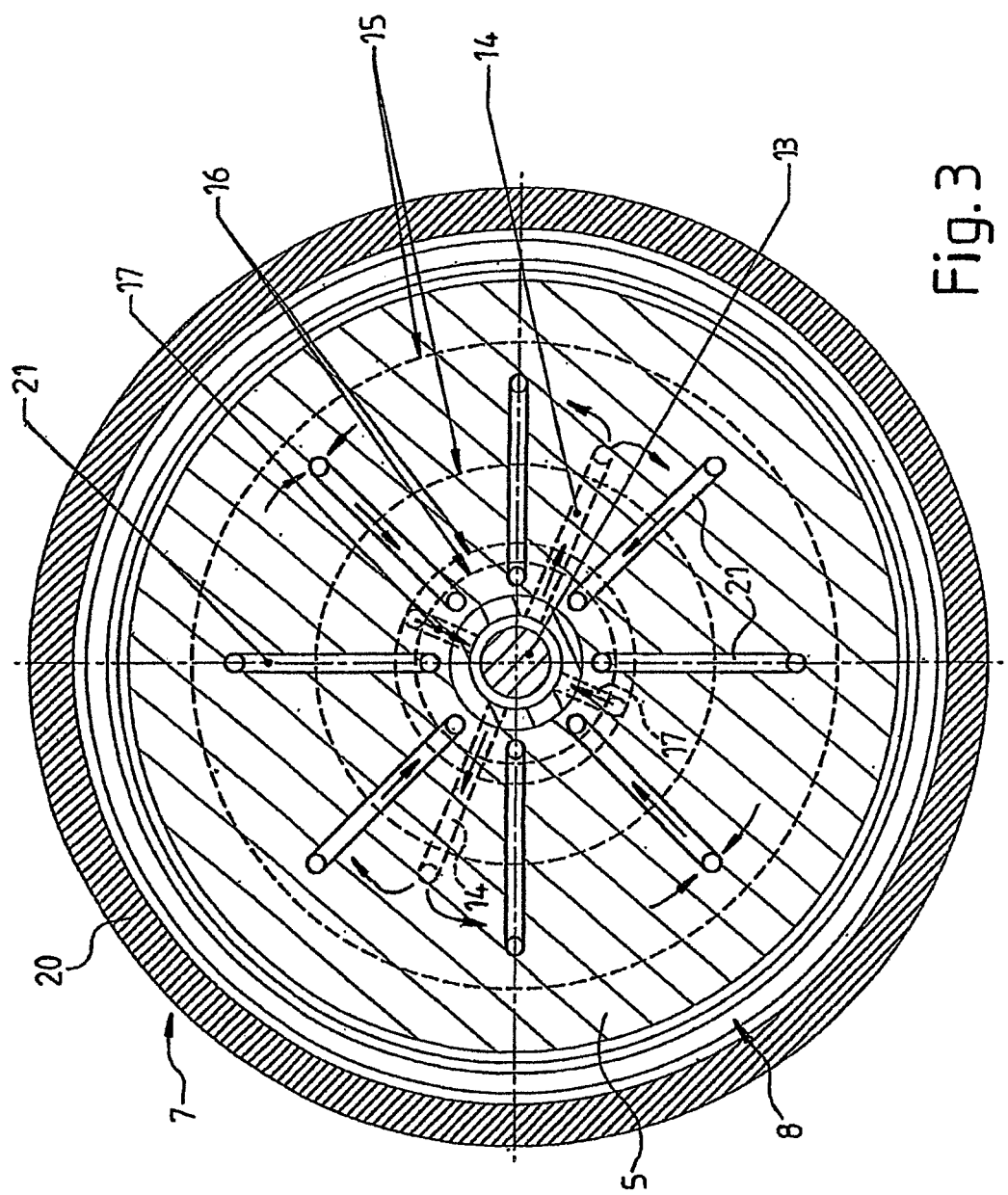
FIG. 3 shows a schematic cross section, oriented perpendicular to the rotational axis, through the rotary table according to FIG. 1.

In FIG. 1, a forward-flow duct 14 and a return-flow duct 17 are represented merely schematically on the same or on the depicted sectional plane. This is intended to serve merely as a schematic representation, since, in practice, rather an embodiment in which there are respectively provided two forward-flow ducts 14, which are offset by 180°, i.e. are symmetrically configured on, for example, the depicted sectional plane, and in which there are arranged two return-flow ducts 17, which are rotated relative to this forward-flow plane through 90° about the rotational axis R and are disposed in a return-flow plane, is of advantage. This means that, as can be seen in FIG. 3, viewed in cross section from above onto the rotary table 1, a forward-flow duct 14, offset/rotated respectively through 90°, herein alternates correspondingly with a return-flow duct 17. As a result, a symmetrical configuration of all forward-flow and return-flow ducts 14, 17 is realized, and thus an imbalance of the rotary table 1 or of the internal cooling is avoided.

In FIG. 2, the rotary table 1 is represented in a second section, wherein two cooling or distribution ducts 18 are visible. Thus FIG. 2 illustrates that the cooling medium, in particular, the cooling liquid, flow from the first annular duct 15, respectively via the distribution ducts 18, to the second, viewed in the vertical direction, "bottom" annular duct 16. To this end, in FIG. 2, as incidentally also in FIG. 1, the flow directions of the cooling fluid are represented schematically with arrows.

Preferably, a plurality of, for instance 12 or 24 cooling ducts 18 or distribution ducts 18, are arranged, in particular symmetrically and/or in a start shape, around the rotational axis R. As a result, both a uniform cooling in the peripheral direction and avoidance of an imbalance, is ensured by the cooling ducts 18 or distribution ducts 18.

In FIG. 2, a restriction 19 in the end region of a distribution duct 18 additionally represented. A restriction 19 of this type can, for instance, in practice be realized as a stud screw with central bore, fitted into the distribution duct 18. By virtue of the reduction in cross section at the restriction 19 or by virtue of the bore of the stud screw, it advantageously becomes possible that the pressure or flow volume in the distribution duct 18 can respectively be very accurately adjusted. Moreover, by virtue of an exact configuration of the cross sections of the restriction 19 or of the bore in the corresponding stud screw, a uniform pressure adjustment in all cooling ducts 18 or distribution ducts 18 is realized. This ensures a uniform cooling, and thus a uniform temperature regulation, of the rotating components of the rotary table 1 or of the rotatable rotor 5 from "inside".

Preferably, a closed cooling circuit of the cooling medium is realized. That is to say that, for instance with the aid of an advantageous pump or pressure generating unit, the cooling medium, in particular, the cooling liquid, is introduced via the feed duct 11, via the rotary feedthrough 13, into the rotor 5, and conducted via the annular ducts 15, 16 and the distribution ducts 18 back again into the rotary feedthrough 13 and can be conducted out of the rotary table 1 by means of the return flow line or discharge line 12 to the pump and/or to a medium reservoir or liquid reservoir and/or at least one heat-exchanging element, preferably in a closed cooling circuit.

Without detailed representation, both an "external" cooling of the electromagnetic drive system 3 or of the electric motor 3 on the outer peripheral surface 10 and an "external" cooling of the mounting, in particular of the bearing 8, can be realized. As a result, an advantageous external and internal cooling, and thus a full or uniform temperature regulation of almost the whole of the rotary table 1, can be realized according to the present invention. This ensures a particularly high accuracy in the machining with a rotary table 1 according to the present invention.

Especially in FIG. 3, the arrangement of the annular ducts 15, 16 in conjunction with the radial cooling ducts 18 or radially oriented portions 21, is illustrated schematically, wherein the portions 21 are preferredly arrangement on a plane or even surface oriented perpendicular/orthogonal to the rotational axis, i.e. in the present case in the plane of the page. Schematic flow arrows of the cooling medium are herein indicated singly in order to better illustrate the basic throughflow of the rotor unit 5 or of the rotary table according to the present invention, in particular of the inflow and outflow into/out of the cooling ducts 18 or radial portions 21.

A rotary table according to the invention which is represented in the figures has an, in the peripheral direction, uniform temperature of the rotary table, in particular, of the rotor unit. A (significant) change in temperature of the cooling medium through heat absorption herein takes place, on the one hand, in the annular ducts 15, 16 (during the inflow/outflow and distribution within the ducts 15,16), and especially, on the other hand, substantially along the radially oriented cooling ducts 18 or portions 21.

Consequently, according to the represented variant of the present invention, no relevant temperature changes/increases arise in the peripheral direction, but rather substantially only in the radial direction. This advantageously results in the avoidance of an adverse change in the orientation of the rotational axis, and thus in a particularly high quality in the machining of the workpiece, or of the operation of the machine tool having a rotary table according to the present invention.

REFERENCE SYMBOL LIST 1 rotary table
2 table plate
3 drive motor
4 permanent magnet
5 rotor
6 coil
7 stator
8 bearing
9 bearing
10 outer side
11 line
12 line
13 rotary feedthrough
14 duct
15 annular duct
16 annular duct
17 duct
18 duct
19 restriction
20 rotary table housing
21 portion
A spacing
B spacing
D diameter
L length
R rotational axis

The invention claimed is:

1. A rotary table for a machine tool comprising a stator unit, a rotor unit rotatable at least about a rotational axis, wherein the rotor unit comprises at least one receiving unit for the reception of a workpiece, a first bearing unit and a second bearing unit that are arranged along the rotational axis of the rotor unit in an axial direction for the mounting of the rotor unit in the stator unit, and an electromagnetic motor drive, which is provided for the motorized driving of the rotor unit, wherein the rotor unit has at least one rotor-cooling apparatus, comprising a cooling medium and at least one cooling surface, having a feed line in a rotary feedthrough, the feed line is fluidly connected to a first annular duct, which is configured to distribute the cooling medium, that is arranged along the rotational axis of the rotor unit in the axial direction so as to be between the first bearing unit and the second bearing unit in the rotor unit, with the first annular duct surrounding the rotational axis of the rotor unit in a plan view, the first annular duct is fluidly connected to a second annular duct, which is configured to collect the cooling medium, that is arranged along the rotational axis of the rotor unit in the axial direction so as to be below the second bearing unit in the rotor unit, with the second annular duct surrounding the rotational axis of the rotor unit in the plan view, and the second annular duct is fluidly connected to a return line in the rotary feedthrough for the cooling and/or absorption of waste heat from the motor drive and/or from the first and second bearing units.

2. The rotary table as claimed in claim 1, wherein an axial spacing and a radial spacing are provided between the first bearing unit and the second bearing unit.

3. The rotary table as claimed in claim 1, wherein, in the plan view, the first annular duct is arranged in the rotor unit between the first bearing unit and the second bearing unit so as to extend substantially over the whole of the periphery, for the distribution of the cooling medium.

4. The rotary table as claimed in claim 1, further comprising a plurality of cooling ducts and/or cooling elements, respectively having at least one cooling surface and distributed/arranged at least partially over the periphery.

5. The rotary table as claimed in claim 4, wherein the cooling ducts and/or cooling elements respectively have at least one substantially radially oriented portion.

6. The rotary table as claimed in claim 5, wherein the substantially radially oriented portions of the cooling ducts and/or cooling elements are arranged substantially perpendicular to the rotational axis and/or on one plane.

7. The rotary table as claimed in claim 5, wherein the substantially radially oriented portions of the cooling ducts and/or cooling elements are arranged between the first annular duct, for distributing the cooling medium into the portions, and the second annular duct, for collecting the cooling medium from the portions.

8. The rotary table as claimed in claim 4, wherein at least one of the cooling ducts and/or cooling elements has at least one pressure control element for controlling the pressure of the cooling medium.

9. The rotary table for a machine tool as claimed in claim 1, wherein the rotary table is configured as a swiveling circular table.

10. A machine tool having a rotary table as claimed in claim 1.

11. A turntable for a machine tool comprising a stator unit and a rotor unit rotatable about at least one axis of rotation, wherein the rotor unit comprises at least one receiving unit for receiving a workpiece, a first bearing unit for mounting the rotor unit in the stator unit, and an electromagnetic motor drive for motorized driving of the rotor unit, wherein the rotor unit has, at least in the region of the motor drive and/or of the first bearing unit, at least one rotor cooling device comprising a coolant and at least one cooling surface for cooling and/or receiving waste heat from the motor drive and/or the first bearing unit, a plurality of cooling channels and/or cooling elements, each having at least one cooling surface and being distributed/arranged at least partially over a circumference such that the cooling channels and/or cooling elements each have at least one substantially radially oriented section, and at least one second bearing unit for mounting the rotor unit, wherein a spacing is provided between the first bearing unit and the second bearing unit, wherein, viewed along the axis of rotation in the axial direction and/or transversely to the axis of rotation in the radial direction, the rotor cooling device has at least one annular channel which is arranged between the first bearing unit and the second bearing unit and which extends substantially over the entire circumference for distributing and/or collecting coolant, such that substantially radially oriented sections of the cooling channels and/or cooling elements are arranged between a first annular channel, which is a distributor annular channel, for distributing coolant into the substantially radially oriented sections and a second annular channel, which is a collecting annular channel, for collecting coolant from the substantially radially oriented sections.

12. The turntable according to claim 11, wherein, viewed along the axis of rotation in the axial direction and/or transversely to the axis of rotation in the radial direction, the rotor cooling device has at least one annular channel which is arranged between the first bearing unit and the motor drive and which extends substantially over the entire circumference for distributing and/or collecting coolant.

13. The turntable according to claim 11, wherein the substantially radially oriented sections of the cooling channels and/or cooling elements are arranged substantially perpendicular to the axis of rotation and/or on a plane.

14. The turntable according to claim 11, wherein at least one of the cooling channels and/or cooling elements has at least one pressure control element for controlling the pressure of the coolant.

15. The turntable for a machine tool according to claim 11, wherein the turntable is configured as a tilting rotary table.

16. A machine tool having a turntable according to claim 11.

* * * * *